(12) United States Patent
Wang et al.

(10) Patent No.: US 7,731,139 B2
(45) Date of Patent: Jun. 8, 2010

(54) SUCTION DEVICE AND SUPPORTING DEVICE HAVING THE SAME

(75) Inventors: Chen-Hsing Wang, Taipei (TW); Chia-Hung Su, Taipei (TW)

(73) Assignee: Lite-On Technology Corp., Taipei (TW)

( * ) Notice: Subject to any disclaimer, the term of this patent is extended or adjusted under 35 U.S.C. 154(b) by 215 days.

(21) Appl. No.: 11/802,016

(22) Filed: May 18, 2007

(65) Prior Publication Data
US 2008/0149790 A1 Jun. 26, 2008

(30) Foreign Application Priority Data
Dec. 22, 2006 (TW) .............................. 95222648 U

(51) Int. Cl.
*A45D 42/14* (2006.01)
(52) U.S. Cl. .............. 248/205.5; 248/205.6; 248/206.1; 248/683; 248/304; 248/309.3
(58) Field of Classification Search ............. 248/205.5, 248/205.6, 205.7, 205.8, 206.1, 206.2, 683, 248/309.3, 304
See application file for complete search history.

(56) References Cited

U.S. PATENT DOCUMENTS

| 6,234,435 | B1* | 5/2001 | Yeh ........................ 248/205.5 |
|---|---|---|---|
| 6,308,923 | B1* | 10/2001 | Howard .................... 248/205.5 |
| 6,550,735 | B1* | 4/2003 | Zheng ........................ 248/304 |
| 6,749,160 | B1* | 6/2004 | Richter .................... 248/206.2 |
| 7,007,908 | B2* | 3/2006 | Tsay ....................... 248/309.3 |
| 7,066,434 | B2* | 6/2006 | Kwok ...................... 248/205.8 |
| 7,293,750 | B2* | 11/2007 | Richter .................... 248/205.5 |
| 2007/0262217 | A1* | 11/2007 | Wang et al. .............. 248/205.5 |
| 2007/0290105 | A1* | 12/2007 | Liu ......................... 248/205.5 |
| 2008/0210833 | A1* | 9/2008 | Wang ...................... 248/205.7 |

* cited by examiner

*Primary Examiner*—A. Joseph Wujciak, III
*Assistant Examiner*—Todd M. Epps
(74) *Attorney, Agent, or Firm*—Rosenberg, Klein & Lee

(57) ABSTRACT

A suction device includes a sucking member having a connecting body connected integrally to a flexible disc body that is disposed under an upright sleeve, a connecting member disposed in the sleeve and connected to the connecting body, and an operating rod connected pivotally to a pivot block unit on the sleeve and to the connecting member. The operating rod is operable so that an assembly of the connecting member and the connecting body is pulled upwardly, thereby forming a vacant space between a central portion of the disc body and a supporting surface to which a peripheral portion of the disc body is attached sealingly.

4 Claims, 6 Drawing Sheets

SUCTION DEVICE AND SUPPORTING DEVICE HAVING THE SAME

CROSS-REFERENCE TO RELATED APPLICATION

This application claims priority of Taiwanese Application No. 095222648, filed on Dec. 22, 2006.

BACKGROUND OF THE INVENTION

1. Field of the Invention

The invention relates to a suction device, more particularly to a suction device that can be operated using a single hand, and a supporting device having the same.

2. Description of the Related Art

Referring to FIGS. 1 and 2, a conventional suction device 1 is shown to include a hollow base 11 having a sleeve 14 that extends upwardly from a top surface 111 of the base 11, a sucking member 12 disposed under the base 11, a connecting rod 121 extending upwardly from a top surface of the sucking member 12 through the base 11, and an operating rod 13. The operating rod 13 has a pivot end portion 133 connected pivotally to the connecting rod 121, an operating end portion 132 opposite to the pivot end portion 133, and an intermediate fulcrum portion 131. The pivot end portion 133 of the operating rod 13 is in the form of a cam that abuts against the top surface 111 of the base 11.

The suction device 1 can be switched from a non-sucking state, where the base 11 is spaced apart from the sucking member 12 and where the operating end portion 132 is pivoted away from the base 11, as shown in FIG. 1, to a sucking state, where a peripheral portion 122 of the sucking member 12 is attached sealingly to a supporting surface 101 as a result of pressing of the base 11 thereon and where a central portion 123 of the sucking member 12 is pulled upwardly, thereby forming a vacant space 120 between the supporting surface 101 and the central portion 123 of the sucking member 12, as shown in FIG. 2, by operating the operating rod 13. In actual operation of the suction device 1 from the non-sucking state to the sucking state, the operating end portion 132 of the operating rod 13 is pivoted toward the base 11 such that the base 11 moves downwardly toward the sucking member 12 due to pressing of the pivot end portion 133 to abut against the peripheral portion 122 of the sucking member 12 until the intermediate fulcrum portion 131 abuts against the base 11. Thereafter, the operating end portion 132 is pressed downwardly such that an assembly of the pivot end portion 133 of the operating rod 13, the connecting rod 121 and the central portion 123 of the sucking member 12 move upwardly, thereby forming the vacant space 120.

In such a configuration, during operation, in addition to operation of the operating rod 13 using one hand of a user, it is required to support the conventional suction device 1 using the other hand of the user before the base 11 can be placed to abut against the peripheral portion 122 of the sucking member 12, thereby resulting in inconvenience during use.

SUMMARY OF THE INVENTION

Therefore, the object of the present invention is to provide a suction device, and a supporting device having the same that can be operated using a single hand.

According to one aspect of the present invention, a suction device comprises:

an upright sleeve extending in a longitudinal direction and having a through hole unit and an annular outer surface formed with a pivot block unit that is disposed adjacent to the through hole unit;

a sucking member having a flexible disc body disposed under the sleeve and having a peripheral portion that is adapted to be attached sealingly to a supporting surface and that abuts against the sleeve, and a central portion connected integrally to the peripheral portion and adapted to be spaced apart from the supporting surface, and a connecting body connected integrally to the central portion of the disc body and extending upwardly into the sleeve;

a connecting member disposed in the sleeve and having a first connecting portion connected to the connecting body of the sucking member so as to allow synchronous movement of the connecting member and the connecting body of the sucking member, and a second connecting portion opposite to the first connecting portion in the longitudinal direction; and an operating rod unit including at least one operating rod that has a pivot end portion extending into the sleeve through the through hole unit in the sleeve and connected pivotally to the second connecting portion of the connecting member, an operating end portion opposite to the pivot end portion, and an intermediate fulcrum portion interconnecting the pivot end portion and the operating end portion, and connected pivotally to the pivot block unit.

The operating end portion of the operating rod of the operating rod unit is operable so as to pivot the pivot end portion of the operating rod of the operating rod unit upwardly such that an assembly of the connecting member and the connecting body of the sucking member is pulled upwardly, thereby forming a vacant space between the central portion of the disc body of the sucking member and the supporting surface.

According to another aspect of the present invention, there is provided a supporting device adapted for an electronic device. The supporting device comprises:

a suction device including an upright sleeve extending in a longitudinal direction and having a through hole unit and an annular outer surface formed with a pivot block unit that is disposed adjacent to the through hole unit, a sucking member having a flexible disc body disposed under the sleeve and having a peripheral portion that is adapted to be attached sealingly to a supporting surface and that abuts against the sleeve, and a central portion connected integrally to the peripheral portion and adapted to be spaced apart from the supporting surface, and a connecting body connected integrally to the central portion of the disc body and extending upwardly into the sleeve, a connecting member disposed in the sleeve and having a first connecting portion connected to the connecting body of the sucking member so as to allow synchronous movement of the connecting member and the connecting body of the sucking member, and a second connecting portion opposite to the first connecting portion in the longitudinal direction, and an operating rod unit including at least one operating rod that has a pivot end portion extending into the sleeve through the through hole unit in the sleeve and connected pivotally to the second connecting portion of the connecting member, an operating end portion opposite to the pivot end portion, and an intermediate fulcrum portion interconnecting the pivot end portion and the operating end portion, and connected pivotally to the pivot block unit; and a supporting member having an inserting end portion inserted into the sleeve of the suction device, and a mounting end portion adapted to be mounted with the electronic device thereon.

The operating end portion of the operating rod of the operating rod unit is operable so as to pivot the pivot end portion of the operating rod of the operating rod unit upwardly such that an assembly of the connecting member and the connecting body of the sucking member is pulled upwardly, thereby forming a vacant space between the central portion of the disc body of the sucking member and the supporting surface.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
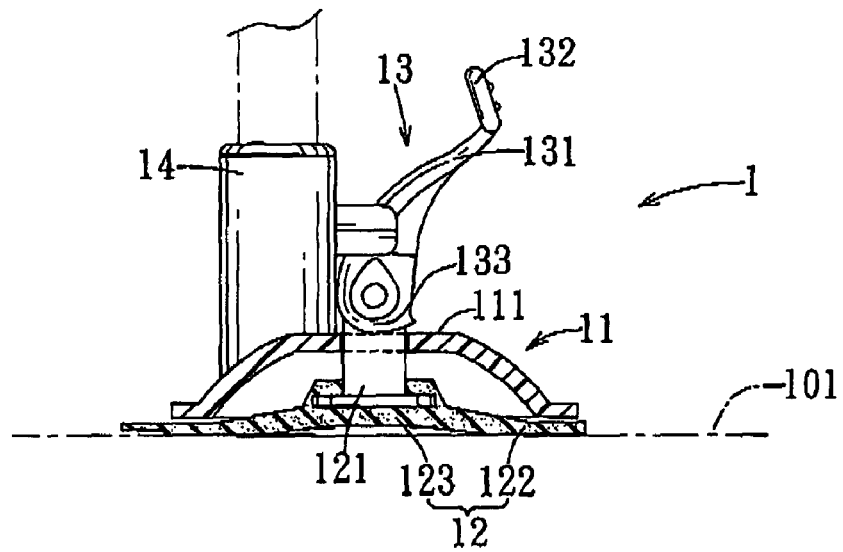
FIG. 1 is a schematic partly sectional view of a conventional suction device.
Figure 2:
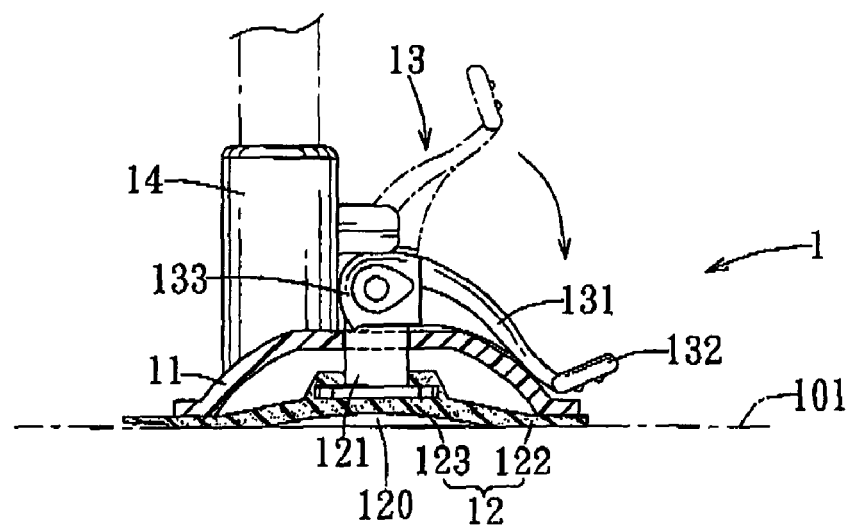
FIG. 2 is a schematic partly sectional view showing the conventional suction device when in a state of use.

Before the present invention is described in greater detail, it should be noted that like elements are denoted by the same reference numerals throughout the disclosure.

Figure 3:
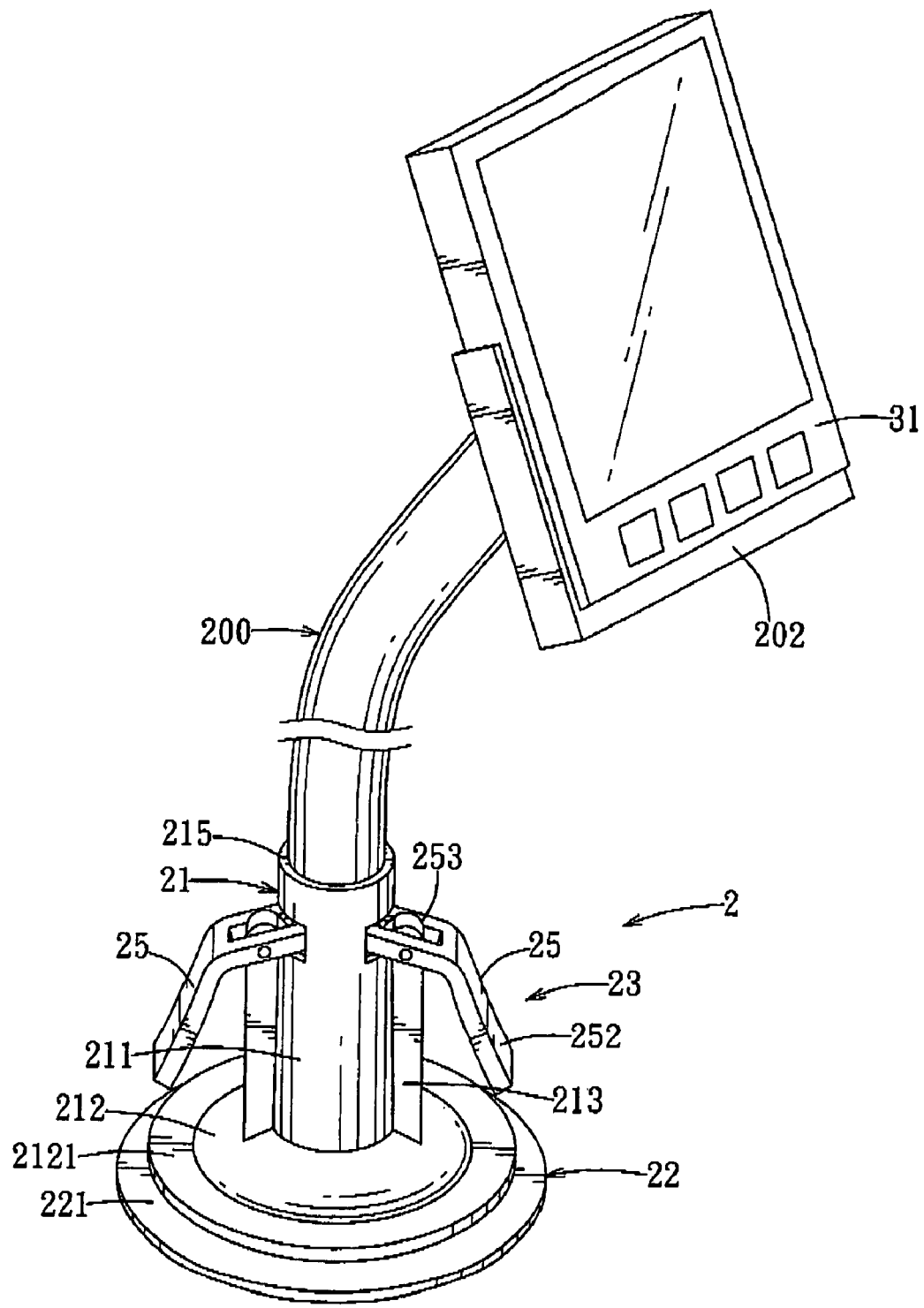
FIG. 3 is a perspective view showing the first preferred embodiment of a suction device according to the present invention, together with a supporting member to form a supporting device for an electronic device.
Figure 4:
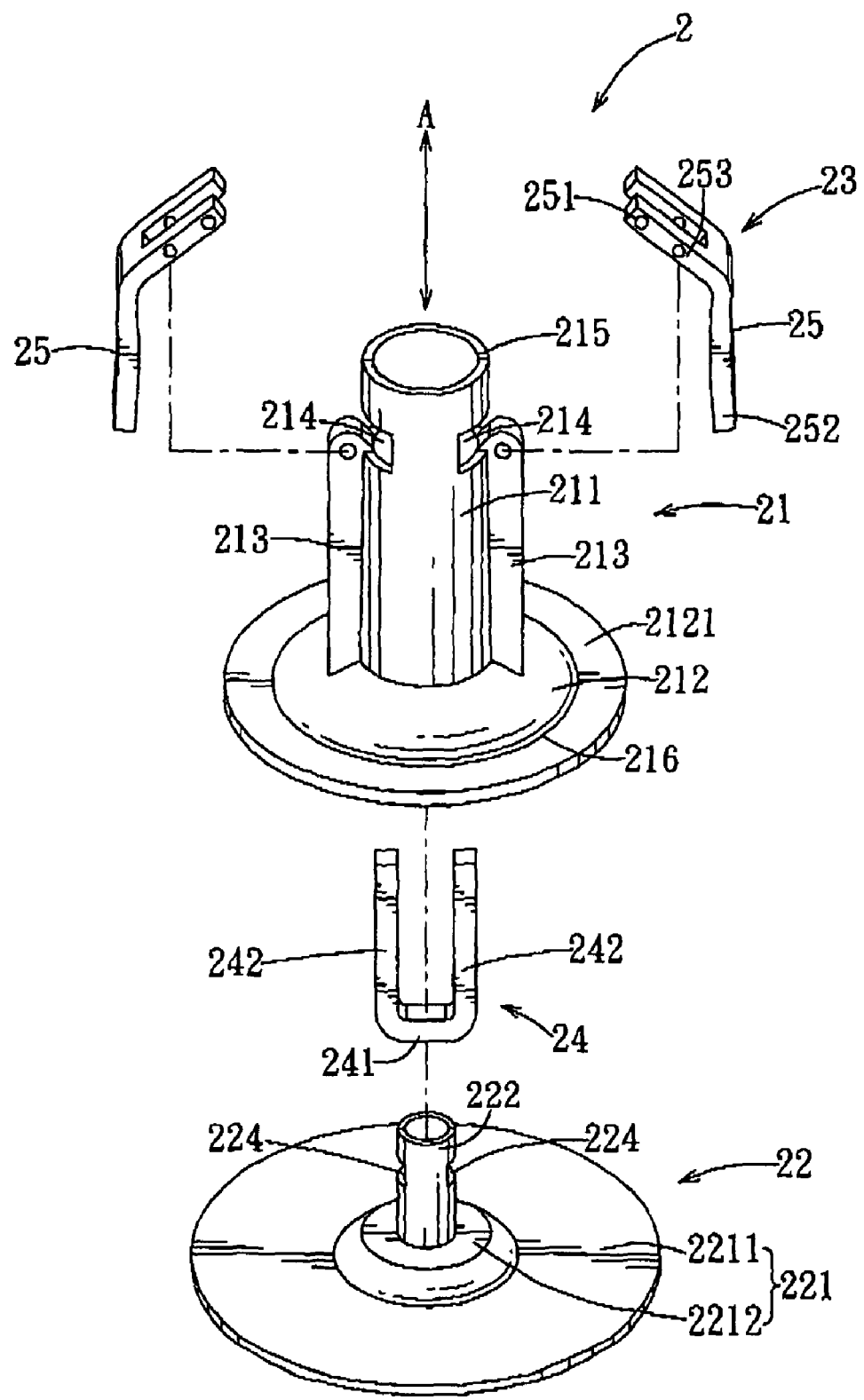
FIG. 4 is an exploded perspective view showing the first preferred embodiment.
Figure 5:
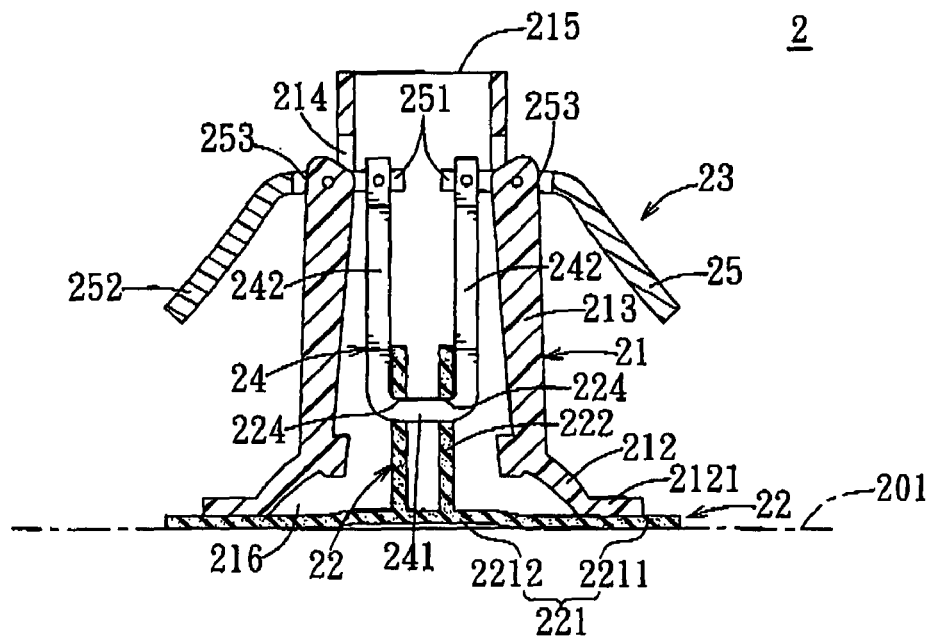
FIG. 5 is a schematic sectional view showing the first preferred embodiment when in a non-sucking state.

Referring to FIGS. 3 to 5, the first preferred embodiment of a suction device 2 according to the present invention is shown to include an upright sleeve 21, a sucking member 22, a connecting member 24, and an operating rod unit 23.

The sleeve 21 is made of a hard plastic material, extends along a longitudinal direction (A), and has an open top end 215, an open bottom end 216, and a lower end portion 212 having a diameter that increases gradually toward the bottom end 216 (see FIG. 5). The sleeve 21 further has an annular flange 2121 that extends radially and outwardly from the bottom end 216. The sleeve 21 has an annular outer surface 211 formed with a through hole unit that is disposed adjacent to the top end 215, and a pivot block unit that is disposed adjacent to the through hole unit. In this embodiment, the through hole unit includes two diametrically opposed through holes 214. The pivot block unit includes two elongate pivot blocks 213 extending in the longitudinal direction (A) and disposed respectively adjacent to the through holes 214. The sleeve 21 is adapted to permit insertion of an inserting end portion of a supporting member 200 there in to via the top end 215. The supporting member 200 has a mounting end portion 202 for mounting an electronic device 31 thereon, such as a mobile phone, a PDA, or a satellite navigation device, as shown in FIG. 3. As such, the suction device 2 is adapted to cooperate with the support member 200 to constitute a repositionable supporting device for the electronic device 31.

The sucking member 22 is made of silicone rubber, and has a flexible disk body 221 and a tubular connecting body 222. The disc body 221 is disposed under the sleeve 21, and has a peripheral portion 2211 that is adapted to be attached sealingly to a supporting surface 201 and that abuts against the annular flange 2121 of the sleeve 21, and a central portion 2212 connected integrally to the peripheral portion 2211 and adapted to be spaced apart from the supporting surface 201. The tubular connecting body 222 is connected integrally to the central portion 2212 of the disc body 221 and extends upwardly into the sleeve 21.

The connecting member 24 is made of a flexible material, such as plastic or metal, is disposed in the sleeve 21, and has a first connecting portion connected to the connecting body 222 of the sucking member 22 so as to allow synchronous movement of the connecting member 24 and the connecting body 222 of the sucking member 22, and a second connecting portion opposite to the first connecting portion in the longitudinal direction (A). In this embodiment, the connecting member 24 is a U-shaped rod that has parallel vertical rod bodies 242 each having opposite upper and lower ends, and a horizontal rod body 241 interconnecting the lower ends of the vertical rod bodies 242 and extending through two diametrically opposed through holes 224 in the connecting body 222 of the sucking member 22. As such, the horizontal rod body 241 constitutes the first connecting portion of the connecting member 24. The upper ends of the vertical rods 242 constitute the second connecting portion of the connecting member 24.

In this embodiment, the operating rod unit 23 includes a pair of operating rods 25, which are made of a flexible material, such as plastic or metal. Each operating rod 25 has a pivot end portion 251 extending through a corresponding one of the through holes 214 in the sleeve 21 and into the sleeve 21 and connected pivotally to a corresponding one of the upper ends of the vertical rod bodies 242 of the connecting member 24, an operating end portion 252 opposite to the pivot end portion 251, and an intermediate fulcrum portion 253 interconnecting the pivot end portion 251 and the operating end portion 252, and connected pivotally to a corresponding one of the pivot blocks 213 of the pivot block unit.

Figure 6:
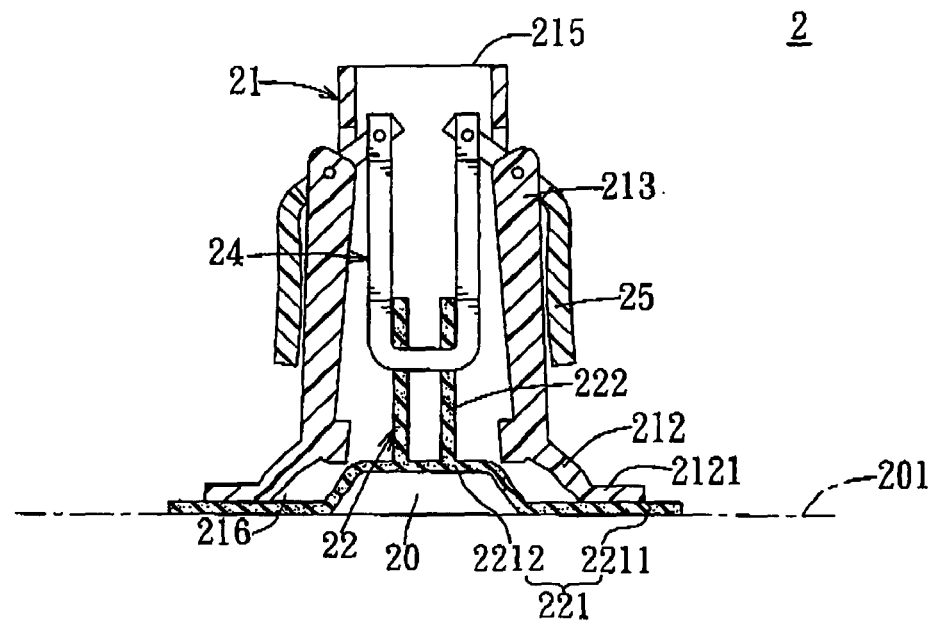
FIG. 6 is a schematic sectional view showing the first preferred embodiment when in a sucking state.
Figure 7:
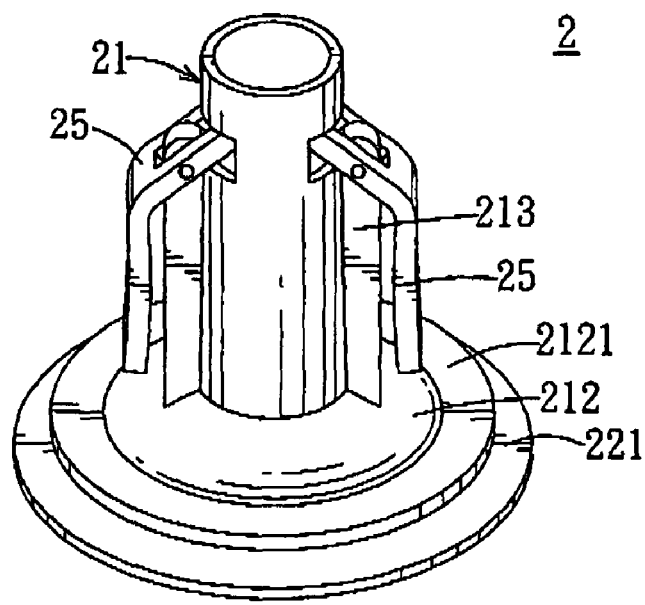
FIG. 7 is a perspective view showing the first preferred embodiment when in the sucking state.

In actual operation, the operating end portions 252 of the operating rods 25 of the operating rod unit 23 are operable so as to pivot the pivot end portions 251 of the operating rods 25 of the operating rod unit 23 upwardly such that an assembly of the connecting member 24 and the connecting body 222 of the sucking member 22 is pulled upwardly, thereby forming a vacant space 20 between the central portion 2212 of the disc body 221 of the sucking member 22 and the supporting surface 201, as best shown in FIG. 6. At this time, the suction device 2 is in a sucking state (see FIG. 7).

Figure 8:
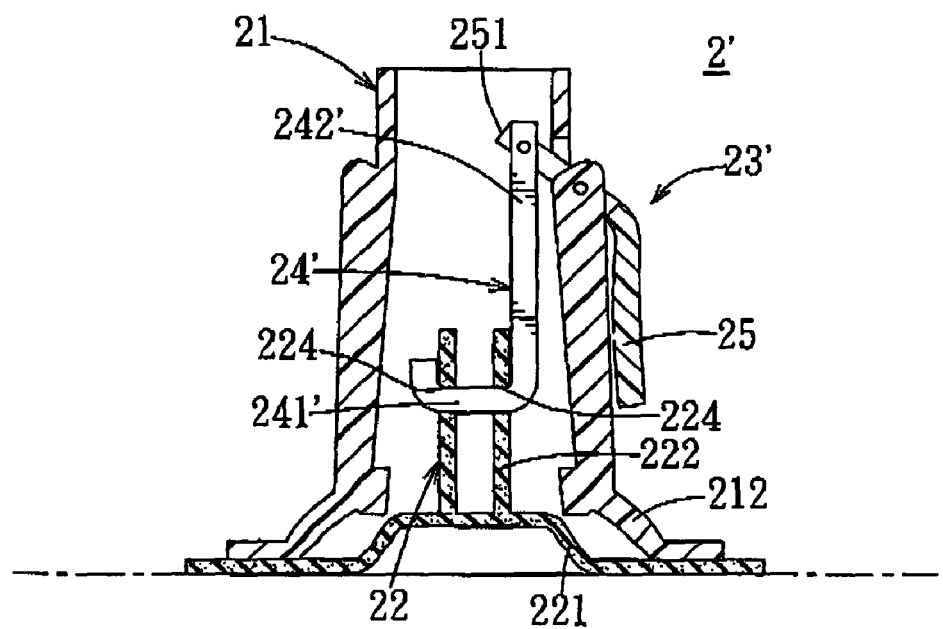
FIG. 8 is a schematic sectional view showing the second preferred embodiment of a suction device according to the present invention.

FIG. 8 illustrates the second preferred embodiment of a suction device 2' according to this invention, which is a modification of the first preferred embodiment. In this embodiment, the connecting member 24' is an L-shaped rod that has a lower hook portion 241' and a vertical portion 242'. The lower hook portion 241' extends through the through holes 224 in the connecting body 222 of the sucking member 22, and constitutes the first connecting portion of the connecting member 24'. The vertical portion 242' is connected integrally to the lower hook portion 241', and constitutes the second connecting portion of the connecting member 24'. The operating rod unit 23' merely has a single operating rod 25. The pivot end portion 251 of the operating rod 25 is connected pivotally to the vertical portion 242' of the connecting member 24'.

Figure 9:
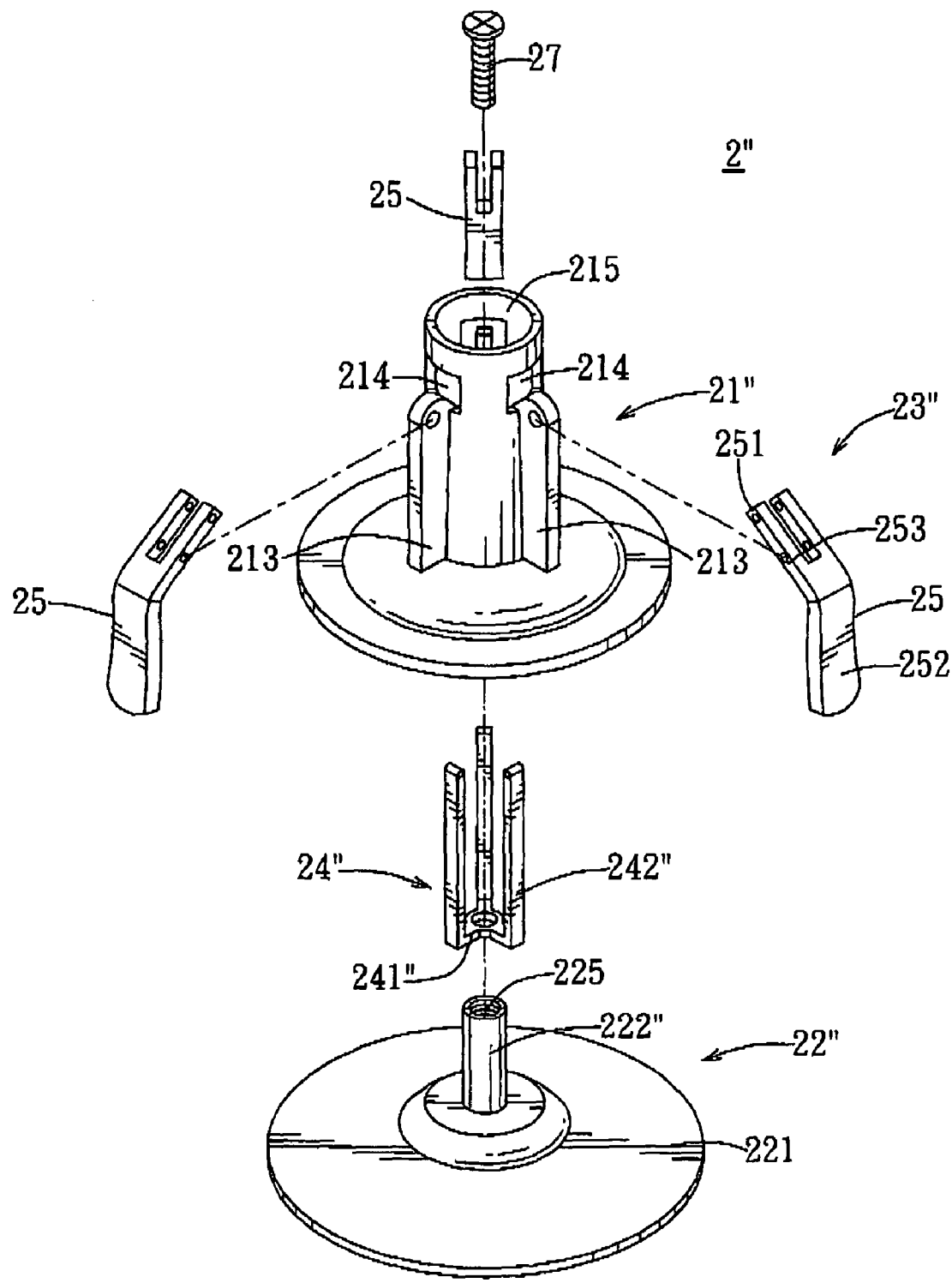
FIG. 9 is an exploded perspective view showing the third preferred embodiment of a suction device according to the present invention.

FIG. 9 illustrates the third preferred embodiment of a suction device 2" according to this invention, which is a modification of the first preferred embodiment. In this embodiment, the through hole unit in the sleeve 21" includes three spaced-apart through holes 214 disposed adjacent to the top end 215. The pivot block unit of the sleeve 21" includes three pivot blocks 213 disposed respectively adjacent to the through holes 214. The connecting member 24" has a base plate 241" constituting the first connecting portion of the connecting member 24", and three vertical rods 242" extending upwardly from a periphery of the base plate 241" and spaced apart from each other. Upper ends of the vertical rods 242" constitute the second connecting portion of the connecting member 24". A screw fastener 27 extends through the base plate 241", and is screwed into a threaded hole 225 in the connecting body 222" of the sucking member 22", thereby connecting the connecting member 24" to the connecting body 222" of the sucking member 22". The operating rod unit 23" includes three operating rods 25. The pivot end portions 251 of the operating rods 25 extend respectively through the through holes 214 in the sleeve 21" and into the sleeve 21", and are connected pivotally and respectively to the upper ends of the vertical rods 242" of the connecting member 24". The intermediate fulcrum portions 253 of the operating rods 25 are connected pivotally and respectively to the pivot blocks 213.

In sum, the suction device 2, 2', 2" of this invention can be switched to the sucking state by manually operating the operating rod unit 23, 23', 23" using a single hand, thereby facilitating operation during use.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A suction device comprising;
    an upright sleeve extending in a longitudinal direction and having a through hole unit and an annular outer surface formed with a pivot block unit that is disposed adjacent to said through hole unit, said though hole unit including diametrically opposed though holes, said pivot block unit of said sleeve including two pivot blocks disposed respectively adjacent to said though holes;
    a sucking member having a flexible disc body disposed under said sleeve and having a peripheral portion that is adapted to be attached sealingly to a supporting surface and that abuts against said sleeve, and a central portion connected integrally to said peripheral portion and adapted to be spaced apart from the supporting surface, and a connecting body connected integrally to said central portion of said disc body and extending upwardly into said sleeve;
    a connecting member disposed in said sleeve and having a first connecting portion connected to said connecting body of said sucking member so as to allow synchronous movement of said connecting member and said connecting body of said sucking member, and a second connecting portion opposite to said first connecting portion in the longitudinal direction, said connecting member being a U-shaped rod having parallel vertical rod bodies, each of said vertical rod bodies having opposite upper and lower ends, and a horizontal rod body interconnecting said lower ends of said vertical rod bodies and extending through said connecting body of said sucking member, said horizontal rod body constituting said first connecting portion of said connecting member, said upper ends of said vertical rod bodies constituting said second connecting portion of said connecting member; and
    an operating rod unit including a pair of operating rods, each of said pair of operating rods having a pivot end portion extending into said sleeve through a corresponding one of said through holes of said through hole unit in said sleeve and connected pivotally to a corresponding one of said upper ends of said vertical rod bodies of said U-shaped rod, an operating end portion opposite to said pivot end portion, and an intermediate fulcrum portion interconnecting said pivot end portion and said operating end portion, and connected pivotally to a corresponding one of said pivot blocks of said pivot block unit;
    wherein said operating end portions of said operating rods of said operating rod unit are operable so as to pivot said pivot end portions of said operating rods of said operating rod unit upwardly such that an assembly of said connecting member and said connecting body of said sucking member is pulled upwardly, thereby forming a vacant space between said central portion of said disc body of said sucking member and the supporting surface.

2. The suction device as claimed in claim 1, wherein said sleeve further has an annular flange that extends radially and outwardly from a bottom end of said sleeve and that abuts against said peripheral portion of said disc body of said sucking member.

3. A supporting device adapted for an electronic device, comprising:
    a suction device including
    an upright sleeve extending in a longitudinal direction and having a through hole unit and an annular outer surface formed with a pivot block unit that is disposed adjacent to said through hole unit, said through hole unit including diametrically opposed through holes, said pivot block unit including two pivot blocks disposed respectively adjacent to said through holes,
    a sucking member having a flexible disc body disposed under said sleeve and having a peripheral portion that is adapted to be attached sealingly to a supporting surface and that abuts against said sleeve, and a central portion connected integrally to said peripheral portion and adapted to be spaced apart from the supporting surface, and a connecting body connected integrally to said central portion of said disc body and extending upwardly into said sleeve,
    a connecting member disposed in said sleeve and having a first connecting portion connected to said connecting body of said sucking member so as to allow synchronous movement of said connecting member and said connecting body of said sucking member, and a second connecting portion opposite to said first connecting portion in the longitudinal direction, said connecting member being a U-shaped rod that has parallel vertical rod bodies, each of the vertical rod bodies having opposite upper and lower ends, and a horizontal rod body interconnecting said lower ends of said vertical rod bodies and extending through said connecting body of said sucking member, said horizontal rod body constituting said first connecting portion of said connecting member, said upper ends of said vertical rod bodies constituting said second connecting portion of said connecting member, and an operating rod unit including a pair of operating rods, each of said operating rods having a pivot end portion extending into said sleeve through a corresponding one of said through holes of said through hole unit in said sleeve and connected pivotally to a corresponding one of said upper ends of said vertical rod bodies of said U-shaped rod, an operating end portion opposite to said pivot end portion, and an intermediate fulcrum portion interconnecting said pivot end portion and said operating end portion, and connected pivotally to a corresponding one of said pivot blocks of said pivot block unit; and a supporting member having an inserting end portion inserted into an upper end of said sleeve of said suction device, and a mounting end portion adapted to be mounted with the electronic device thereon;

wherein said operating end portions of said operating rods of said operating rod unit are operable so as to pivot said pivot end portions of said operating rods of said operating rod unit upwardly such that an assembly of said connecting member and said connecting body of said sucking member is pulled upwardly, thereby forming a vacant space between said central portion of said disc body of said sucking member and the supporting surface.

4. The supporting device as claimed in claim 3, wherein said sleeve further has an annular flange that extends radially and outwardly from a bottom end of said sleeve and that abuts against said peripheral portion of said disc body of said sucking member.

* * * * *